United States Patent
Hirota et al.

(10) Patent No.: US 9,902,654 B2
(45) Date of Patent: Feb. 27, 2018

(54) ZRO2-AL2O3-BASED CERAMIC SINTERED COMPACT AND PRODUCTION METHOD THEREOF

(71) Applicants: THE DOSHISHA, Kyoto-shi, Kyoto (JP); DAIICHI KIGENSO KAGAKU KOGYO CO., LTD., Osaka (JP)

(72) Inventors: Ken Hirota, Kyotanabe (JP); Xiaoteng Ge, Kyotanabe (JP); Hideo Kimura, Osaka (JP)

(73) Assignees: THE DOSHISHA, Kyoto (JP); DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 15/390,088

(22) Filed: Dec. 23, 2016

(65) Prior Publication Data

US 2017/0362129 A1 Dec. 21, 2017

(30) Foreign Application Priority Data

Jun. 20, 2016 (JP) ................................. 2016-121915

(51) Int. Cl.
| | | |
|---|---|---|
| C04B 35/119 | (2006.01) | |
| C04B 35/488 | (2006.01) | |
| C04B 35/64 | (2006.01) | |

(52) U.S. Cl.
CPC .......... *C04B 35/4885* (2013.01); *C04B 35/64* (2013.01); *C04B 2235/3217* (2013.01);
(Continued)

(58) Field of Classification Search
CPC ......................... C04B 35/4885; C04B 35/119
See application file for complete search history.

(56) References Cited

U.S. PATENT DOCUMENTS 6,087,285 A * 7/2000 Oomichi ............... C04B 35/486
501/103
8,987,157 B2 * 3/2015 Ito .......................... C01G 25/02
501/103
(Continued)

FOREIGN PATENT DOCUMENTS

JP  2014-189474 A  10/2014
WO 2012/153645 A1  11/2012

OTHER PUBLICATIONS

7th Japan Conference on Composite Materials (JCCM-7), Kyoto Citizen's Amenity Plaza Kyoto TERRSA, Mar. 16-18, 2016, http://compo.jsms.jp/conference/jccm7/, w/English abstract, cited in Exception of Loss of Novelty (2 pages).

(Continued)

*Primary Examiner* — Karl Group
(74) *Attorney, Agent, or Firm* — Westerman, Hattori, Daniels & Adrian, LLP

(57) ABSTRACT

A $ZrO_2$—$Al_2O_3$-based ceramic sintered compact containing tetragonal $ZrO_2$ particles having a crystallite size of from 5 to 20 nm as a main component and having an $\alpha$-$Al_2O_3$ crystallite size of not greater than 75 nm and a relative density of not less than 99% can be produced by preparing a $Y_2O_3$ partially stabilized $ZrO_2$—$Al_2O_3$-based powder having a molar ratio (mol %) of zirconia ($ZrO_2$) and yttria ($Y_2O_3$) of from 96.5:3.5 to 97.5:2.5 and a mass ratio (mass %) of $ZrO_2$ containing $Y_2O_3$ and alumina ($Al_2O_3$) of from 85:15 to 75:25, molding this powder by cold isostatic pressing, and then performing sintering to a high density by microwave sintering for 45 to 90 min in an inert gas atmosphere at 1200 to 1400° C. When performing microwave sintering, a heating rate is preferably from 5 to 20° C./min up to 600° C. and from 50 to 150° C./min at 600° C. or higher.

7 Claims, 9 Drawing Sheets

(52) U.S. Cl.
CPC .............. *C04B 2235/3225* (2013.01); *C04B 2235/3246* (2013.01); *C04B 2235/604* (2013.01); *C04B 2235/656* (2013.01); *C04B 2235/6562* (2013.01); *C04B 2235/667* (2013.01); *C04B 2235/765* (2013.01); *C04B 2235/77* (2013.01); *C04B 2235/781* (2013.01)

(56) References Cited

U.S. PATENT DOCUMENTS

2007/0111879 A1* 5/2007 Kong ................... B82Y 30/00
501/105
2013/0190164 A1* 7/2013 Ito ........................ C04B 35/481
501/134
2014/0370291 A1* 12/2014 Diaz Rodriguez . C04B 35/4885
428/402

OTHER PUBLICATIONS

Ge et al., "Mechanical Properties of Zirconia-Alumina Composites Sintered Using the Neutralization Co-precipitation Powders", 7th Japan Conference on Composite Materials (JCCM-7), Kyoto Citizen's Amenity Plaza Kyoto TERRSA, Mar. 18, 2016, w/English abstract, cited in Exception of Loss of Novelty (25 pages).

* cited by examiner

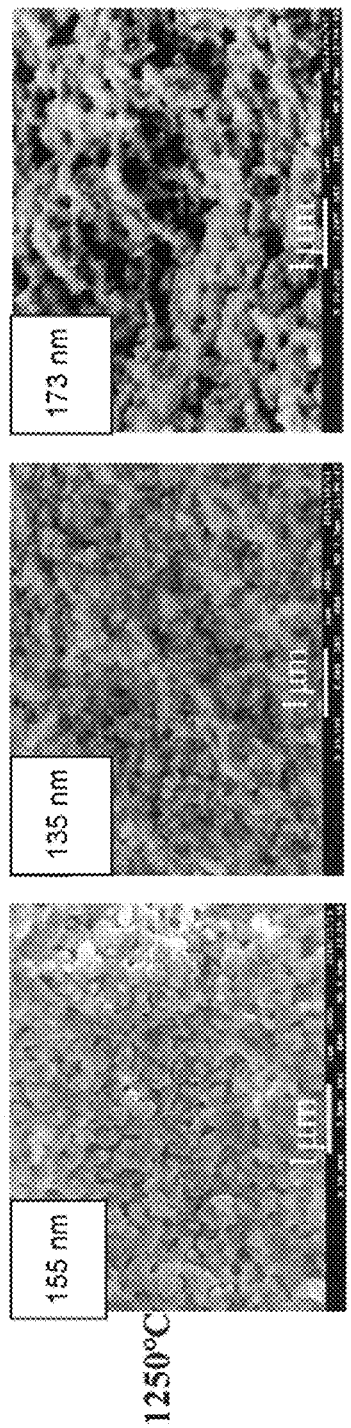
Fig. 3A 1250°C Relative density: 86.7%
Fig. 3B 95.7%
Fig. 3C 99.0%
Fig. 3D 1350°C Relative density: 99.3% conventional electric furnace
Fig. 3E 99.1% PECPS
Fig. 3F 99.3% microwave

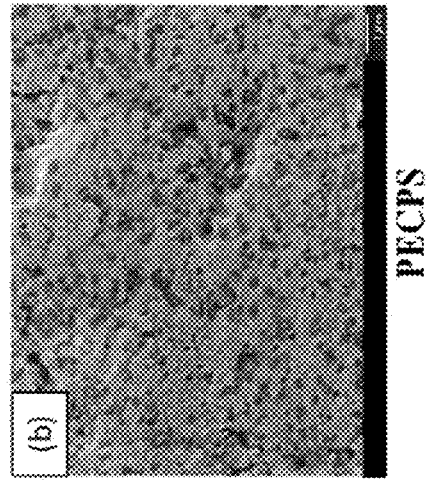
Fig. 4B PECPS
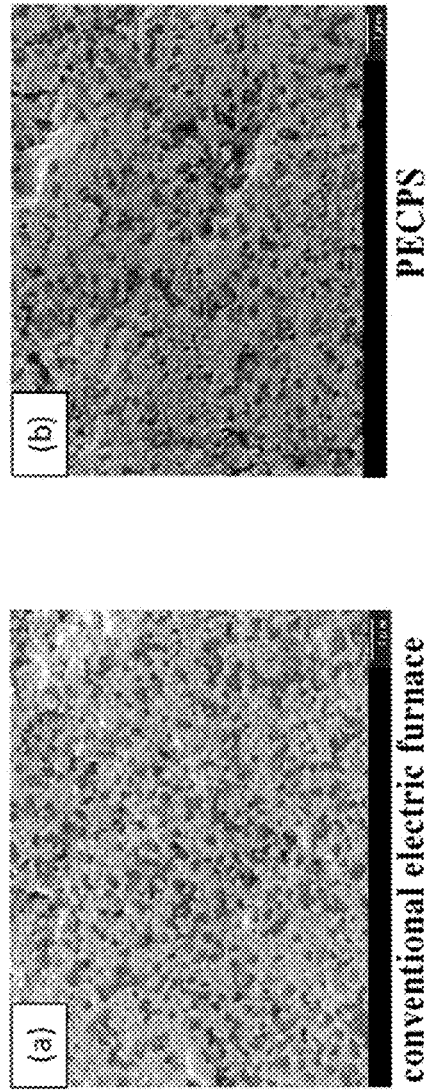
Fig. 4A conventional electric furnace
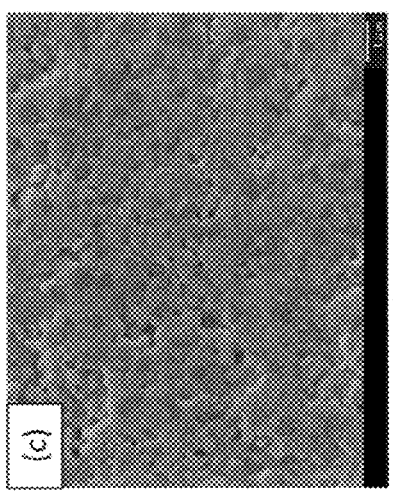
Fig. 4C microwave Fig. 8A conventional electric furnace
The aggregation of Al₂O₃ particles appears to be pronounced.

Fig. 8B PECPS
The aggregation of Al₂O₃ particles is still observed, and there is also particle growth.

Fig. 8C microwave
Al₂O₃ particles appear to be well dispersed.

ZRO2-AL2O3-BASED CERAMIC SINTERED COMPACT AND PRODUCTION METHOD THEREOF

TECHNICAL FIELD

The present invention relates to a $ZrO_2$—$Al_2O_3$-based ceramic sintered compact and a method for producing the ceramic sintered compact.

BACKGROUND ART

Ceramic materials, which have many characteristics such as chemical stability, corrosion resistance, and usability in high-temperature environments in comparison to metals, have high hardness or strength but have the drawback of low toughness, and the application thereof is limited. Further, the enhancement of reliability is viewed as important when a ceramic is used as a structural body. In order to enhance the reliability of a ceramic structure, the structure must be a dense body. To obtain a dense body, it is necessary to reduce voids—that is, the air holes in the sintered body, by sufficiently increasing the sintering temperature. However, when the sintering temperature is increased, the grains of the sintered compact become large, which causes chipping such as grain pulling out from the sintered compact surface. This becomes a source of fracture, which leads to drawback such as reduction in the structural strength of the ceramic. Further, in the case of a ceramic structure containing a plurality of metal oxides, unless the growth of sintered compact crystals of each metal oxide that is contained is controlled harmoniously, problems arise such as dominance of the characteristics of certain types of metal compounds, leading to the lack of structural functionality as a ceramic body which should be inherent to the composition.

In this way, achieving both the densification of a ceramic structure and the size reduction of sintered compact crystals has been a problem in the preparation of ceramics with guaranteed reliability.

As one method of enhancing the reliability of a ceramic structure and enhancing the toughness—that is, the fracture toughness value ($K_{IC}$)—of a ceramic, it has been disclosed in Patent Document 1, for example, that a ceramic with high strength/toughness, which is a dense sintered compact having small crystals and simultaneously exhibiting a bending strength ($\sigma_b$) of not less than approximately 1,000 MPa (1 GPa) and a $K_{IC}$ of not less than 15 MPa·m$^{1/2}$, is obtained by preparing a $ZrO_2$ (0.3 to 1.7 mol % $Y_2O_3$)-25 mol % $Al_2O_3$ solid solution powder containing zirconia ($ZrO_2$) to which yttrium oxide ($Y_2O_3$) having a function of high toughness is added, and alumina ($Al_2O_3$) having a function of high strength, by means of a sol-gel method and performing Pulsed Electric-Current Pressure Sintering (PECPS). However, in this case, there remains a problem in that the raw material preparation cost is high (the cost per 1 g of raw material is over several thousand yen).

On the other hand, in the case of a powder prepared by a solid phase reaction or the like or a powder prepared by a liquid phase method other than a sol-gel method, the composition or particle size distribution of the powder particles may not be uniform. Therefore, even when these powders are sintered, the composition in the ceramic structure may not be uniform, and although the powders are sintered at a high temperature in order to increase homogeneity, the aforementioned problems of densification and size reduction of the sintered compact crystals may not be satisfactorily resolved. Thus, the availability of a ceramic with high strength/toughness is still a problem.

Therefore, in order to resolve the problems described above, the applicants of the present invention and others proposed, in Patent Document 2 below, the production of an oxide-based ceramic ($ZrO_2$—$Al_2O_3$-based ceramic) which simultaneously exhibits high strength and toughness by preparing a zirconia-alumina-based microparticulate powder containing a small amount of yttrium oxide (1.5 mol % $Y_2O_3$) by a coprecipitation process and then molding the powder at a high density and sintering the sintered compact crystals so as to be dense and minute by Pulsed Electric-Current Pressure Sintering (PECPS) at a high heating rate.

However, PECPS has restrictions with regard to the shape of the compact due to uniaxial pressure sintering, and the productivity is also low. From the perspective of cost reduction as well, there are many problems regarding developing ceramics to a wide range of applications.

PRIOR ART DOCUMENTS

Patent Documents

Patent Document 1: WO/2012/153645
Patent Document 2: JP-A-2014-189474

SUMMARY OF THE INVENTION

Problems to be Solved by the Invention

An object of the present invention is to solve the aforementioned problems of conventional technology and to provide a method which makes it possible to obtain a highly reliable sintered compact at low cost (the cost per 1 g of raw material is less than approximately 1/100 the cost of a sintered product produced by a sol-gel method), the sintered compact simultaneously satisfying high strength and toughness and having high density and a small crystallite size, and which makes it possible to produce a high-strength/toughness $ZrO_2$—$Al_2O_3$-based ceramic without any restriction on the shape of the compact—that is, processing the ceramic to the final shape for the use, which is more difficult to process than metals or plastic materials, is unnecessary.

Means for Solving the Problems

As a result of conducting various research, the present inventors and others discovered that a zirconia-alumina-based ceramic sintered at a high density, which has a fine nanostructure with a zirconia crystallite size of from 5 to 20 nm and an alumina crystallite size of not greater than 75 nm, and exhibits high strength and toughness, can be produced. This ceramic can be produced by first producing a dense compact with a free shape from a powder prepared with a coprecipitation process (at a lower cost, less than approximately 1/100 the cost, than a high-cost sol-gel method), or a zirconia-alumina based microparticulate powders of commercially available such as a mixed powder of zirconia which containing a small amount of yttria and alumina, and then performing microwave sintering without pressurization, while heating the interior of the sintered compact so that the same degree of rapid heating as in the case of PECPS can be achieved, thereby completing the present invention.

The $ZrO_2$—$Al_2O_3$-based ceramic sintered compact according to an embodiment of the present invention which is capable of resolving the problems described above comprises a $Y_2O_3$ partially stabilized $ZrO_2$—$Al_2O_3$ composite sintered compact having a molar ratio (mol %) of zirconia ($ZrO_2$) and yttria ($Y_2O_3$) of from 96.5:3.5 to 97.5:2.5 and a mass ratio (mass %) of zirconia containing yttria and alumina ($Al_2O_3$) of from 85:15 to 75:25. And the $ZrO_2$—$Al_2O_3$ composite sintered compact contains tetragonal $ZrO_2$ particles having a crystallite size of from 5 to 20 nm as a main component, a crystallite size of $\alpha$-$Al_2O_3$ is not greater than 75 nm, and the sintered compact has a relative density of not less than 99%. Here, "containing as a main component" means that the content ratio of the component is not less than 70 mass %.

In addition, according to an embodiment of the present invention, for the $ZrO_2$—$Al_2O_3$-based ceramic sintered compact having the characteristics described above, a three-point bending strength is not less than 1.0 GPa; a fracture toughness is not less than 6.0 MPa·m$^{1/2}$; and a Vickers hardness is not less than 12.0 GPa.

Further, the method according to an embodiment of the present invention for producing the $ZrO_2$—$Al_2O_3$-based ceramic sintered compact described above comprises the following steps (A) and (B):

(A): preparing a $Y_2O_3$ partially stabilized $ZrO_2$—$Al_2O_3$-based powder having a molar ratio (mol %) of zirconia ($ZrO_2$) and yttria ($Y_2O_3$) of from 96.5:3.5 to 97.5:2.5 and a mass ratio (mass %) of zirconia containing yttria and alumina ($Al_2O_3$) of from 85:15 to 75:25; and (B): producing a high-density compact by molding the $Y_2O_3$ partially stabilized $ZrO_2$—$Al_2O_3$-based powder by cold isostatic pressing and then performing microwave sintering on the compact in an inert gas atmosphere at 1200 to 1400° C. for 45 to 90 min.

In the following explanations, the notation "$ZrO_2$(3Y)-20 mass % $Al_2O_3$" refers to 80 mass % (97 mol % $ZrO_2$-3 mol % $Y_2O_3$)-20 mass % $Al_2O_3$.

In addition, according to an embodiment of the present invention, in the production method having the characteristics described above, a heating rate during microwave sintering in (B) is from 5 to 20° C./min up to 600° C. and from 50 to 150° C./min at 600° C. or higher.

Further, according to an embodiment of the present invention, in the production method having the characteristics described above, a mixture of a $Y_2O_3$ partially stabilized $ZrO_2$ and an $Al_2O_3$ powder or a solid solution powder produced by a coprecipitation process is used as the $Y_2O_3$ partially stabilized $ZrO_2$—$Al_2O_3$-based powder.

Effect of the Invention

By using the production method according to an embodiment of the present invention, it is possible to produce a high-strength/toughness $ZrO_2$—$Al_2O_3$-based ceramic having a bending strength $\sigma_b$ of $\geq 1$ GPa, a fracture toughness value $K_{IC}$ of $\geq 6$ MPa·m$^{1/2}$, and a Vickers hardness $H_V$ of $\geq 12$ GPa from: a powder prepared with a coprecipitation process, which involves a lower cost than a high-cost sol-gel method; a powder prepared by preparing only a $ZrO_2$ powder in which $Y_2O_3$ is solidified by a coprecipitation process and then further mixing a commercially available microparticulate $Al_2O_3$ with said powder; or a mixed powder of commercially available microparticulate partially stabilized $ZrO_2$ and $Al_2O_3$.

In addition, in the production method according to an embodiment of the present invention using microwave sintering, the crystallite particle sizes of both the $ZrO_2$ and $Al_2O_3$ constituting the ceramic are both far smaller than those of a ceramic produced by PECPS. Therefore, even at the same relative density and grain size of sintered body, the strength and toughness of a microwave-sintered ceramic are higher than those of a PECPS ceramic. Moreover, the production method according to an embodiment of the present invention also has the advantage that a dense sintered compact (relative density: 99.0%) can be produced at a temperature (approximately 1200° C.) approximately 150° C. lower than the sintering temperature of a sintering method using a typical electric sintering furnace with a controlled atmosphere or a PECPS method. Further, because microwave sintering is a method involving heating the interior of a sample in a pressureless manner, the restrictions on the shape of the compact are eliminated to a greater degree than a PECPS sintering method involving uniaxial pressurization and external heating. Processing the ceramic to the final shape for the use, which is more difficult than processing metals or plastic materials, becomes practically unnecessary, which yields a high possibility of leading to low cost and enhanced mass productivity.

BRIEF DESCRIPTION OF THE DRAWINGS

FIG. 3A to FIG. 3F illustrate scanning electron microscope (SEM) photographs of fracture surfaces for $ZrO_2$(3Y)-20 mass % $Al_2O_3$ ceramics produced using various sintering methods (sintering temperature of 1250° C. for FIG. 3A, FIG. 3B, and FIG. 3C, and sintering temperature of 1350° C. for FIG. 3D, FIG. 3E, and FIG. 3F).

FIG. 4A to FIG. 4C illustrate SEM photographs of polished surfaces for $ZrO_2$(3Y)-20 mass % $Al_2O_3$ ceramics produced at 1350° C. using various sintering methods.

MODE FOR CARRYING OUT THE INVENTION

Figure 1:
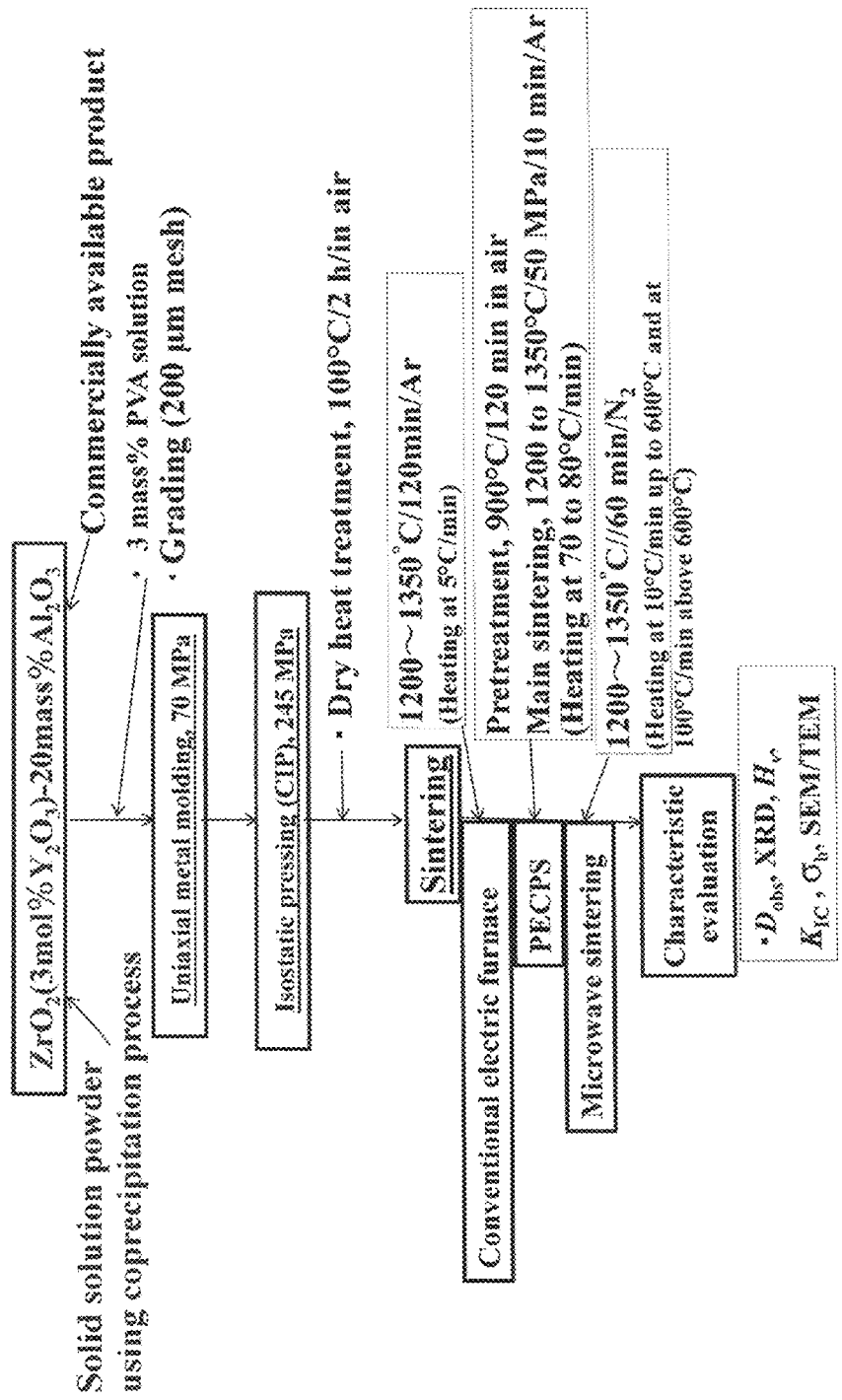
FIG. 1 is a flowchart illustrating the steps of the $ZrO_2$—$Al_2O_3$-based ceramic production method according to an embodiment of the present invention. In addition to the conditions of microwave sintering used in the examples, the sintering conditions of sintering with an electric sintering furnace having a controlled atmosphere and Pulsed Electric-Current Pressure Sintering (PECPS) used in the comparative examples are also listed.

Steps (A) and (B) in the method according to an embodiment of the present invention which enables the production of a high-strength/toughness $ZrO_2$—$Al_2O_3$-based ceramic sintered compact will be described hereinafter.

In the $ZrO_2$—$Al_2O_3$-based ceramic sintered compact according to an embodiment of the present invention, the molar ratio (mol %) of zirconia ($ZrO_2$) and yttria ($Y_2O_3$) is from 96.5:3.5 to 97.5:2.5, and the mass ratio (mass %) of zirconia ($ZrO_2$) containing yttria ($Y_2O_3$) and alumina ($Al_2O_3$) is from 85:15 to 75:25. The reason that the content of $Y_2O_3$ with respect to $ZrO_2$ is limited to 2.5 to 3.5 mol % is that if the content is less than 2.5 mol % or, conversely, the content is more than 3.5%, tetragonal $ZrO_2$ particles cannot be present as a main component. If the content of $Y_2O_3$ is less than 2.5 mol %, the number of monoclinic $ZrO_2$ particles increases, which causes cracks and may cause the bending strength $\sigma_b$ to be smaller than 1 GPa at room temperature or under hydrothermal conditions. If the content of $Y_2O_3$ exceeds 3.5 mol %, the number of cubic $ZrO_2$ particles increases, which causes the fracture toughness value $K_{IC}$ to be smaller than 6 MPa·m$^{1/2}$.

In addition, a preferable content of $Y_2O_3$ in the present invention is from 2.6 to 3.4 mol %, and a particularly preferable added amount of $Y_2O_3$ is from 2.8 to 3.2 mol %. Further, in the present invention, the reason that the content of $Al_2O_3$ is limited to 15 to 25 mass % is that if the content is less than 15 mass %, the properties of the $ZrO_2$ ceramic become dominant and the bending strength $\sigma_b$ becomes less than 1 GPa, whereas if the content exceeds 25 mass %, the properties of the $Al_2O_3$ ceramic become dominant and the fracture toughness value $K_{IC}$ becomes smaller than 6 MPa·m$^{1/2}$.

Note that the bending strength $\sigma_b$ of the $ZrO_2$—$Al_2O_3$-based ceramic sintered compact according to an embodiment of the present invention is not less than 1.0 GPa (preferably not less than 1.2 GPa, and even more preferably not less than 1.4 GPa), the fracture toughness value $K_{IC}$ is not less than 6 MPa·m$^{1/2}$ (preferably not less than 6.4 MPa·m$^{1/2}$), and the Vickers hardness $H_V$ is not less than 12.0 GPa (preferably not less than 12.9 GPa, and even more preferably not less than 15.0 GPa).

In step (A) in an embodiment of the present invention, a commercially available $Y_2O_3$ partially stabilized $ZrO_2$ ($ZrO_2$ powder containing 3 mol % $Y_2O_3$ or the like) for typical zirconia ceramic production and a commercially available $Al_2O_3$ powder may be mixed and used as a starting material so as to achieve the composition described above, but it is preferable to use a solid solution powder prepared by simultaneously mixing $Y_2O_3$ and $Al_2O_3$ with $ZrO_2$ with a coprecipitation method from the perspective of enhancing the dispersion of the composition. The solid solution powder is produced using a zirconium salt, an yttrium salt, and an aluminum salt.

When producing the $Y_2O_3$ partially stabilized $ZrO_2$—$Al_2O_3$ solid solution powder described above, the components are first mixed so that the molar ratio (mol %) of $ZrO_2$ and $Y_2O_3$ is from 96.5:3.5 to 97.5:2.5, and the mass ratio (mass %) of $ZrO_2$ containing $Y_2O_3$ and $Al_2O_3$ is from 85:15 to 75:25. For this procedure, the zirconium salt is not particularly limited, but a chloride aqueous solution, a nitrate aqueous solution, a sulfate aqueous solution, or the like such as zirconium oxychloride ($ZrOCl_2$), zirconium oxynitrate ($ZrO(NO_3)_2$), or zirconium sulfate ($ZrOSO_4$) is typically used. The yttrium salt is also not particularly limited, but a chloride aqueous solution, a nitrate aqueous solution, a sulfate aqueous solution, or the like such as yttrium chloride ($YCl_3$), yttrium nitrate ($Y(NO_3)_3$), or yttrium sulfate ($Y_2(SO_4)_3$) is typically used. In addition, a chloride aqueous solution, a nitrate aqueous solution, or the like such as aluminum chloride ($AlCl_3$) or aluminum nitrate ($Al(NO_3)_3$) is typically used as an aluminum salt.

Next, an alkali is added to the mixed solution containing the salts described above so as to neutralize the solution and to coprecipitate zirconium, yttrium, and aluminum as a precipitate. The resulting precipitate is filtered, washed with water, and dried, then a solid solution powder of 85 to 75 mass % $ZrO_2$ containing from 2.5 to 3.5 mol % of $Y_2O_3$ with respect to $ZrO_2$ (96.5 to 97.5 mol % $ZrO_2$-3.5 to 2.5 mol % $Y_2O_3$) and 15 to 25 mass % $Al_2O_3$ (the powder is amorphous immediately after being prepared) is prepared. For this procedure, the type of alkali used for neutralization is not particularly limited, and a typical basic substance such as sodium hydroxide, potassium hydroxide, or ammonia may be used.

The obtained powder is then heat-treated for 7 to 12 hours at 650 to 750° C., which is lower than or equal to the crystallization temperature, and further preliminarily calcined in the atmosphere for 0.5 to 3 hours at 850 to 950° C., which is higher than or equal to the crystallization temperature, so as to prepare a cubic $Y_2O_3$ partially stabilized $ZrO_2$—$Al_2O_3$ solid solution powder. Such an amorphous solid solution powder comprising 75 to 85 mass % {$ZrO_2$ containing $Y_2O_3$(96.5 to 97.5 mol % $ZrO_2$-3.5 to 2.5 mol % $Y_2O_3$)} and 25 to 15 mass % $Al_2O_3$ obtained by the coprecipitation process has the advantage of a lower cost (less than approximately 1/100) than that of a powder produced by a sol-gel method. Moreover, by heat-treating the prepared nanoparticles in an amorphous state (7 to 12 hours at 650 to 750° C.), the diffusion of zirconium, yttrium, and aluminum atoms/ions inside the particles is accelerated, which makes it possible to homogenize the composition within and among particles. Further, by heat-treating the nanoparticles at a temperature higher than or equal to the crystallization temperature (0.5 to 3 hours at 850 to 950° C.), it is possible to crystallize and stabilize the particles and to promote grain growth so that the crystallite size is constant within the small range.

In addition, in step (B) according to an embodiment of the present invention, a high-strength/toughness $ZrO_2$—$Al_2O_3$-based ceramic is produced by producing a high-density compact by molding the $Y_2O_3$ partially stabilized $ZrO_2$—$Al_2O_3$-based powder prepared in step (A) above by cold isostatic pressing, enclosing the compact with fibers made of zirconia, and then sintering the compact with microwaves having a frequency of 2.45 GHz in an inert gas atmosphere (for example, in a nitrogen gas atmosphere) for 45 to 90 minutes at 1200 to 1400° C. and preferably from 1200 to 1350° C. During this procedure, when the sintering temperature is lower than 1200° C., high bending strength (≥1 GPa) is not achieved, whereas when the sintering temperature exceeds 1400° C., a high fracture toughness value (≥6 MPa·m$^{1/2}$) is not achieved, which is not preferable. A retention time of from 45 to 90 minutes is suitable to achieve sufficient densification. Note that argon, which is an inert gas, cannot be used because argon causes discharge.

In the microwave sintering used in an embodiment in the present invention, the dielectric itself is internally (centrally) heated by an electric (magnetic) field, which makes it possible to achieve energy conservation. Moreover, because the temperature distribution does not depend on the thermal conduction of the sample itself, the temperature distribution is good, and rapid heating is possible, so a dense sintered compact (relative density: not less than approximately 95%) can be produced.

In the present invention, when performing microwave sintering, it is preferable to place the compact in a boron nitride BN crucible, in which zirconia fibers (for example, ZYBF-4 manufactured by Zircar Co., Ltd.) are placed around the compact and a zirconia felt (for example, ZYF-100 manufactured by Zircar Co., Ltd.) is further placed therearound, and to irradiate the resulting configuration with microwaves. In this case, cracking can be effectively prevented from occurring in the sintered compact.

Note that in this step (B), it is typical to perform cold isostatic pressing after adding a binder to the $Y_2O_3$ partially stabilized $ZrO_2$—$Al_2O_3$ mixed powder or a solid solution powder prepared by simultaneously mixing $Y_2O_3$ and $Al_2O_3$ prepared in step (A) and grade the particles. Polyvinyl alcohol (PVA) is preferable as a binder added in this procedure, and the heating temperature when performing microwave sintering in step (B) is preferably from 5 to 20° C./min up to 600° C. and from 50 to 150° C./min at 600° C. or higher. The reason for choosing the low heating rate of from 5 to 20° C. up to 600° C. is to prevent cracking from occurring by suppressing inhomogeneity in the temperature distribution inside the sintered compact since the temperature dependence of the dielectric constant in this temperature range differs significantly between $ZrO_2$ and $Al_2O_3$. The reason for choosing the heating rate at 600° C. or above to the aforementioned range is that if the heating rate is less than 50° C./min, heat treatment is performed for a long time, which leads to a high production cost, whereas if the heating rate conversely exceeds 150° C./min, irregularities arise in the microstructure inside the sintered compact, which makes it difficult to produce a uniform, large sample.

The $ZrO_2$—$Al_2O_3$-based ceramic sintered compact obtained by the method of the present invention comprising steps (A) and (B) described above is a $Y_2O_3$ partially stabilized $ZrO_2$—$Al_2O_3$ having a molar ratio (mol %) of $ZrO_2$ and $Y_2O_3$ of from 96.5:3.5 to 97.5:2.5 and a mass ratio (mass %) of $ZrO_2$ containing $Y_2O_3$ and $Al_2O_3$ of from 85:15 to 75:25; the $ZrO_2$—$Al_2O_3$ composite sintered compact containing tetragonal $ZrO_2$ particles having a crystallite size of from 5 to 20 nm (preferably from 5.5 to 18 nm) as a main component; and a crystallite size of α-$Al_2O_3$ being not greater than 75 nm (preferably from 10 to 60 nm, and even more preferably from 15 to 50 nm). In addition, the relative density of this $ZrO_2$—$Al_2O_3$-based ceramic sintered compact is not less than 99°%. With the method according to an embodiment of the present invention, it is possible to produce a $ZrO_2$—$Al_2O_3$-based ceramic sintered compact having the physical properties described above, wherein the three-point bending strength is not less than 1.0 GPa; the fracture toughness value is not less than 6.0 MPa·m$^{1/2}$; and the Vickers hardness $H_V$ is not less than 12.0 GPa.

With the production method according to an embodiment of the present invention comprising steps (A) and (B) described above, a dense ceramic having a tetragonal $ZrO_2$ content of not less than approximately 90 vol % with respect to the zirconia phase is obtained from a $Y_2O_3$ partially stabilized $ZrO_2$—$Al_2O_3$-based mixed powder or a solid solution powder prepared by simultaneously mixing $Y_2O_3$ and $Al_2O_3$, by uniformly dispersing fine $Al_2O_3$ microparticles into a $ZrO_2$ matrix and further adding a stabilizer $Y_2O_3$ in a small amount of from 2.5 to 3.5 mol % with respect to $ZrO_2$. As a result, the "transformation toughening mechanism" of $ZrO_2$ easily manifests, and high toughness can be achieved. Therefore, this production method is suited for the low-cost production of a high-strength/toughness ceramic (ceramic having a bending strength $\sigma_b \geq 1$ GPa, a fracture toughness value $K_{IC} \geq 6$ MPa·m$^{1/2}$, and a Vickers hardness $H_V \geq 12$ GPa).

EXAMPLES

The present invention will be described specifically hereinafter using examples, but the present invention is in no way limited to these examples. The $ZrO_2$—$Al_2O_3$-based ceramics obtained in Examples and Comparative Examples contain from 1.3 to 2.5 wt. % of hafnium oxide with respect to zirconium oxide as an inevitable impurity.

Note that for each sintered compact produced in the following examples and the like, the bulk density ($D_{obs}$), XRD pattern, Vickers hardness ($H_V$), fracture toughness value ($K_{IC}$), the bending strength ($\sigma_b$), and SEM/TEM images were measured/photographed, and the characteristics of each compact were evaluated.

The bending strength $\sigma_b$ is a value of the three-point bending strength measured under conditions with a span length of 8 mm and a cross-head feed rate of 0.5 mm/min. The fracture toughness value $K_{IC}$ is a value measured in accordance with the indentation (IF) method (K. Niihara et al., J. Master. Sci. Lett., 1, 13-16 (1982)), in which a square-based pyramid diamond indenter was forced into the ceramic surface at a load of 20 kg (196 N) for 15 s and the lengths of cracks generated at the four corners of the resulting indentation were evaluated.

Example 1

Production Example of the High-Strength/Toughness $ZrO_2$—$Al_2O_3$-Based Ceramic with the Production Method According to an Embodiment of the Present Invention
a) Preparation of Raw Material Powder First, a commercially available $Y_2O_3$ partially stabilized $ZrO_2$-based powder (product containing 3 mol % $Y_2O_3$, manufactured by Daiichi Kigenso Kagaku Kogyo Co., Ltd.) produced by a coprecipitation process was prepared, and this $Y_2O_3$-containing $ZrO_2$ and a commercially available $Al_2O$ powder (TM-D grade, manufactured by Taimei Chemicals Co., Ltd.) were weighed so that the mass ratio (mass %) was 80:20 and uniformly mixed using a ball mill to prepare a raw material powder.

b) Preparation of $Y_2O_3$-Containing $ZrO_2$—$Al_2O_3$-Based Ceramic

After the raw material powder described above was subjected to preliminary sintering for 9 hours in air at 700° C. and was then subjected to preliminary sintering for 1 hour at 900° C. the raw material powder was granulated with an aqueous solution containing 3 mass % of polyvinyl alcohol (PVA). Next, the powder was graded (using a mesh with an opening size of 200 μm), and this was subjected to die molding (uniaxial pressure: 70 MPa). Next, cold isostatic press treatment was performed (245 MPa/3 min) to increase the density. The obtained compact was then dried (110° C./2 h) to remove water content in the PVA, and microwave sintering was performed in a nitrogen atmosphere at a sintering temperature of 1200° C., a sintering time of 60 min, and a heating rate of 10° C./min up to 600° C. and 100° C./min above 600° C. using a microwave sintering apparatus equipped with a 2.45 GHz microwave oscillator (3000 W output/completely water cooled) to produce a sintered compact.

The obtained sintered compact was a dense body having a sintering density of 5.44 g/cm$^3$ and a relative density $D_{obs}/D_x$ of 99.0%. The crystallite size calculated from an XRD pattern was 12.4 nm, 3.84 nm, and 47.3 nm for t-$ZrO_2$, m-$ZrO_2$, and α-$Al_2O_3$, respectively. As a result of measuring the mechanical characteristics of this sintered compact, the bending strength $\sigma_b$ was 1.03 GPa, the Vickers hardness $H_V$ was 12.9 GPa, and the fracture toughness value $K_{IC}$ was 6.02 MPa·m$^{1/2}$.

Example 2

The preparation of a raw material powder was the same as in a) of Example 1. A $Y_2O_3$-containing $ZrO_2$—$Al_2O_3$-based ceramic was prepared in the same manner as in b) of Example 1 with the exception that the sintering temperature was set to 1250° C. The obtained sintered compact was a dense body having a sintering density of 5.44 g/cm$^3$ and a relative density $D_{obs}/D_x$ of 99.0%. The crystallite size calculated from an XRD pattern was 5.9 nm, 6.9 nm, and 15.8 nm for t-$ZrO_2$, m-$ZrO_2$, and α-$Al_2O_3$, respectively. As a result of measuring the mechanical characteristics of this sintered compact, the bending strength $O_b$ was 1.26 GPa, the Vickers hardness $H_V$ was 13.1 GPa, and the fracture toughness value $K_{IC}$ was 6.03 MPa·m$^{1/2}$.

Example 3

The preparation of a raw material powder was the same as in a) of Example 1. A $Y_2O_3$-containing $ZrO_2$—$Al_2O_3$-based ceramic was prepared in the same manner as in b) of Example 1 with the exception that the sintering temperature was set to 1300° C. The obtained sintered compact was a dense body having a sintering density of 5.46 g/cm$^3$ and a relative density $D_{obs}/D_x$ of 99.3%. The crystallite size calculated from an XRD pattern was 17.7 nm, 9.25 nm, and 23.0 nm for t-$ZrO_2$, m-$ZrO_2$, and α-$Al_2O_3$, respectively. As a result of measuring the mechanical characteristics of this sintered compact, the bending strength $\sigma_b$ was 1.41 GPa, the Vickers hardness $H_V$ was 15.7 GPa, and the fracture toughness value $K_{IC}$ was 6.90 MPa·m$^{1/2}$.

Example 4

The preparation of a raw material powder was the same as in a) of Example 1. A $Y_2O_3$-containing $ZrO_2$—$Al_2O_3$-based ceramic was prepared in the same manner as in b) of Example 1 with the exception that the sintering temperature was set to 1350° C. The obtained sintered compact was a dense body having a sintering density of 5.46 g/cm$^3$ and a relative density $D_{obs}/D_x$ of 99.3%. The crystallite size calculated from an XRD pattern was 13.0 nm, 4.29 nm, and 49.5 nm for t-$ZrO_2$, m-$ZrO_2$, and α-$Al_2O_3$, respectively. As a result of measuring the mechanical characteristics of this sintered compact, the bending strength $\sigma_b$ was 1.54 GPa, the Vickers hardness $H_V$ was 15.7 GPa, and the fracture toughness value $K_{IC}$ was 6.41 MPa·m$^{1/2}$.

Comparative Example 1

The preparation of a raw material powder was the same as in a) of Example 1. A $Y_2O_3$-containing $ZrO_2$—$Al_2O_3$-based ceramic was prepared with an electric sintering furnace for the purpose of comparison with Examples 1 to 4. Sintering was performed using a commercially available electric sintering furnace in an argon atmosphere at a sintering temperature of 1200° C., a sintering time of 120 min, and a heating rate of 5° C./min. The obtained sintered compact had a sintering density of 4.15 g/cm$^3$ and a relative density $D_{obs}/D_x$ of 75.5%, and was not a dense body. The crystallite size calculated from an XRD pattern was 5.6 nm, 8.36 nm, and 48.7 nm for t-$ZrO_2$, m-$ZrO_2$, and α-$Al_2O_3$, respectively. As a result of measuring the mechanical characteristics of this sintered compact, the bending strength $\sigma_b$ was 0.269 GPa, the Vickers hardness $H_V$ was 5.26 GPa, and the fracture toughness value $K_{IC}$ was 3.73 MPa·m$^{1/2}$.

Comparative Example 2

The preparation of a raw material powder was the same as in a) of Example 1. A $Y_2O_3$-containing $ZrO_2$—$Al_2O_3$-based ceramic was prepared in the same manner as in Comparative Example 1 with the exception that the sintering temperature of the electric sintering furnace was set to 1250° C. The obtained sintered compact had a sintering density of 4.76 g/cm$^3$ and a relative density $D_{obs}/D_x$ of 86.7% and was not a dense body. The crystallite size calculated from an XRD pattern was 32.9 n, 6.33 nm, and 9.9 nm for t-$ZrO_2$, m-$ZrO_2$, and α-$Al_2O_3$, respectively. As a result of measuring the mechanical characteristics of this sintered compact, the bending strength $\sigma_b$ was 0.532 GPa, the Vickers hardness $H_V$ was 9.44 GPa, and the fracture toughness value $K_{IC}$ was 4.72 MPa·m$^{1/2}$.

Comparative Example 3

The preparation of a raw material powder was the same as in a) of Example 1. A $Y_2O_3$-containing $ZrO_2$—$Al_2O_3$-based ceramic was prepared in the same manner as in Comparative Example 1 with the exception that the sintering temperature of the electric sintering furnace was set to 1300° C. The obtained sintered compact had a sintering density of 5.27 g/cm$^3$ and a relative density $D_{obs}/D_x$ of 96.0%, indicating that the sintered body was dense but had a slightly low relative density. The crystallite size calculated from an XRD pattern was 34.5 nm, 41.3 nm, and 46.9 nm for t-$ZrO_2$, m-$ZrO_2$, and α-$Al_2O_3$, respectively. As a result of measuring the mechanical characteristics of this sintered compact, the bending strength $\sigma_b$ was 0.557 GPa, the Vickers hardness $H_V$ was 13.8 GPa, and the fracture toughness value $K_{IC}$ was 5.29 MPa·m$^{1/2}$.

Comparative Example 4

The preparation of a raw material powder was the same as in a) of Example 1. A $Y_2O_3$-containing $ZrO_2$—$Al_2O_3$-based ceramic was prepared in the same manner as in Comparative Example 1 with the exception that the sintering temperature of the electric sintering furnace was set to 1350° C. The obtained sintered compact had a sintering density of 5.46 g/cm$^3$ and a relative density $D_{obs}/D_x$ of 99.3%, indicating that the sintered body was dense but had a slightly low relative density. The crystallite size calculated from an XRD pattern was 27.0 nm, 6.17 nm, and 41.7 nm for t-$ZrO_2$, m-$ZrO_2$, and α-$Al_2O_3$, respectively. As a result of measuring the mechanical characteristics of this sintered compact, the bending strength $\sigma_b$ was 0.651 GPa, the Vickers hardness $H_V$ was 15.7 GPa, and the fracture toughness value $K_{IC}$ was 5.81 MPa·m$^{1/2}$.

Comparative Example 5

The preparation of a raw material powder was the same as in a) of Example 1. A $Y_2O_3$-containing $ZrO_2$—$Al_2O_3$-based ceramic was prepared by Pulsed Electric-Current Pressure Sintering (PECPS) for the purpose of comparison with Examples 1 to 4. Sintering was performed using a commercially available pulsed electric-current sintering apparatus (using SPS-510A manufactured by SPS Syntex (Ltd.)) in an argon gas atmosphere at a pressurization pressure of 50 MPa, a sintering temperature of 1200° C., a retention time of 10 min, and a heating rate of 70 to 80° C./min. The obtained sintered compact had a sintering density of 5.13 g/cm$^3$ and a relative density $D_{obs}/D_x$ of 93.4% and was not a dense body. The crystallite size calculated from an XRD pattern was 41.7 nm, 6.58 nm, and 53.7 nm for t-$ZrO_2$, m-$ZrO_2$, and α-$Al_2O_3$, respectively. As a result of measuring the mechanical characteristics of this sintered compact, the bending strength $O_b$ was 0.276 GPa, the Vickers hardness $H_V$ was 14.0 GPa, and the fracture toughness value $K_{IC}$ was 4.86 MPa·m$^{1/2}$.

Comparative Example 6

The preparation of a raw material powder was the same as in a) of Example 1. A $Y_2O_3$-containing $ZrO_2$—$Al_2O_3$-based ceramic was prepared in the same manner as in Comparative Example 5 with the exception that the sintering temperature of Pulsed Electric-Current Pressure Sintering (PECPS) was set to 1250° C. for the purpose of comparison with Examples 1 to 4. The obtained sintered compact had a sintering density of 5.26 g/cm$^3$ and a relative density $D_{obs}/D_x$ of 95.7% and was not a dense body. The crystallite size calculated from an XRD pattern was 26.4 nm, 3.12 nm, and 37.1 nm for t-$ZrO_2$, m-$ZrO_2$, and α-$Al_2O_3$, respectively. As a result of measuring the mechanical characteristics of this sintered compact, the bending strength $\sigma_b$ was 0.459 GPa, the Vickers hardness $H_V$ was 14.9 GPa, and the fracture toughness value $K_{IC}$ was 4.96 MPa·m$^{1/2}$.

Comparative Example 7

The preparation of a raw material powder was the same as in a) of Example 1. A $Y_2O_3$-containing $ZrO_2$—$Al_2O_3$-based ceramic was prepared in the same manner as in Comparative Example 5 with the exception that the sintering temperature of Pulsed Electric-Current Pressure Sintering (PECPS) was set to 1300° C. for the purpose of comparison with Examples 1 to 4. The obtained sintered compact was a dense body having a sintering density of 5.49 g/cm$^3$ and a relative density $D_{obs}/D_x$ of 99.9%. The crystallite size calculated from an XRD pattern was 34.2 nm, 14.70 nm, and 40.3 nm for t-$ZrO_2$, m-$ZrO_2$, and α-$Al_2O_3$, respectively. As a result of measuring the mechanical characteristics of this sintered compact, the bending strength $\sigma_b$ was 0.973 GPa, the Vickers hardness $H_V$ was 15.1 GPa, and the fracture toughness value $K_{IC}$ was 5.88 MPa·m$^{1/2}$.

Comparative Example 8

The preparation of a raw material powder was the same as in a) of Example 1. A $Y_2O_3$-containing $ZrO_2$—$Al_2O_3$-based ceramic was prepared in the same manner as in Comparative Example 5 with the exception that the sintering temperature of Pulsed Electric-Current Pressure Sintering (PECPS) was set to 1350° C. for the purpose of comparison with Examples 1 to 4. The obtained sintered compact was a dense body having a sintering density of 5.44 g/cm$^3$ and a relative density $D_{obs}/D_x$ of 99.1%. The crystallite size calculated from an XRD pattern was 13.0 nm, 6.50 nm, and 97.0 nm for t-$ZrO_2$, m-$ZrO_2$, and α-$Al_2O_3$, respectively. As a result of measuring the mechanical characteristics of this sintered compact, the bending strength $\sigma_b$ was 0.768 GPa, the Vickers hardness $H_V$ was 15.5 GPa, and the fracture toughness value $K_{IC}$ was 7.25 MPa·m$^{1/2}$.

The characteristics of the present invention will be described in detail hereinafter using the drawings and tables.

Table 1 below summarizes the physical property values of the sintered compacts of Examples 1 to 4 and Comparative Examples 1 to 8.

TABLE 1

| | Sintering method | Sintering temperature (° C.) | $D_{obs}$ (g/cm$^3$) | $D_{obs}/D_x$ (g/cm$^3$) | Crystallite size t-$ZrO_2$ (nm) | Crystallite size m-$ZrO_2$ (nm) | Crystallite size α-$Al_2O_3$ (nm) |
|---|---|---|---|---|---|---|---|
| Example 1 | Microwave | 1200 | 5.44 | 99.0 | 12.4 | 3.84 | 47.3 |
| Example 2 | Microwave | 1250 | 5.44 | 99.0 | 5.9 | 6.9 | 15.8 |
| Example 3 | Microwave | 1300 | 5.46 | 99.3 | 17.7 | 9.25 | 23.0 |
| Example 4 | Microwave | 1350 | 5.46 | 99.3 | 13.0 | 4.29 | 49.5 |
| Comparative Example 1 | Conventional | 1200 | 4.15 | 75.5 | 5.6 | 8.36 | 48.7 |
| Comparative Example 2 | Conventional | 1250 | 4.76 | 86.7 | 32.9 | 6.33 | 9.9 |
| Comparative | Conventional | 1300 | 5.27 | 96.0 | 34.5 | 41.3 | 46.9 |

TABLE 1-continued

Figure 5:
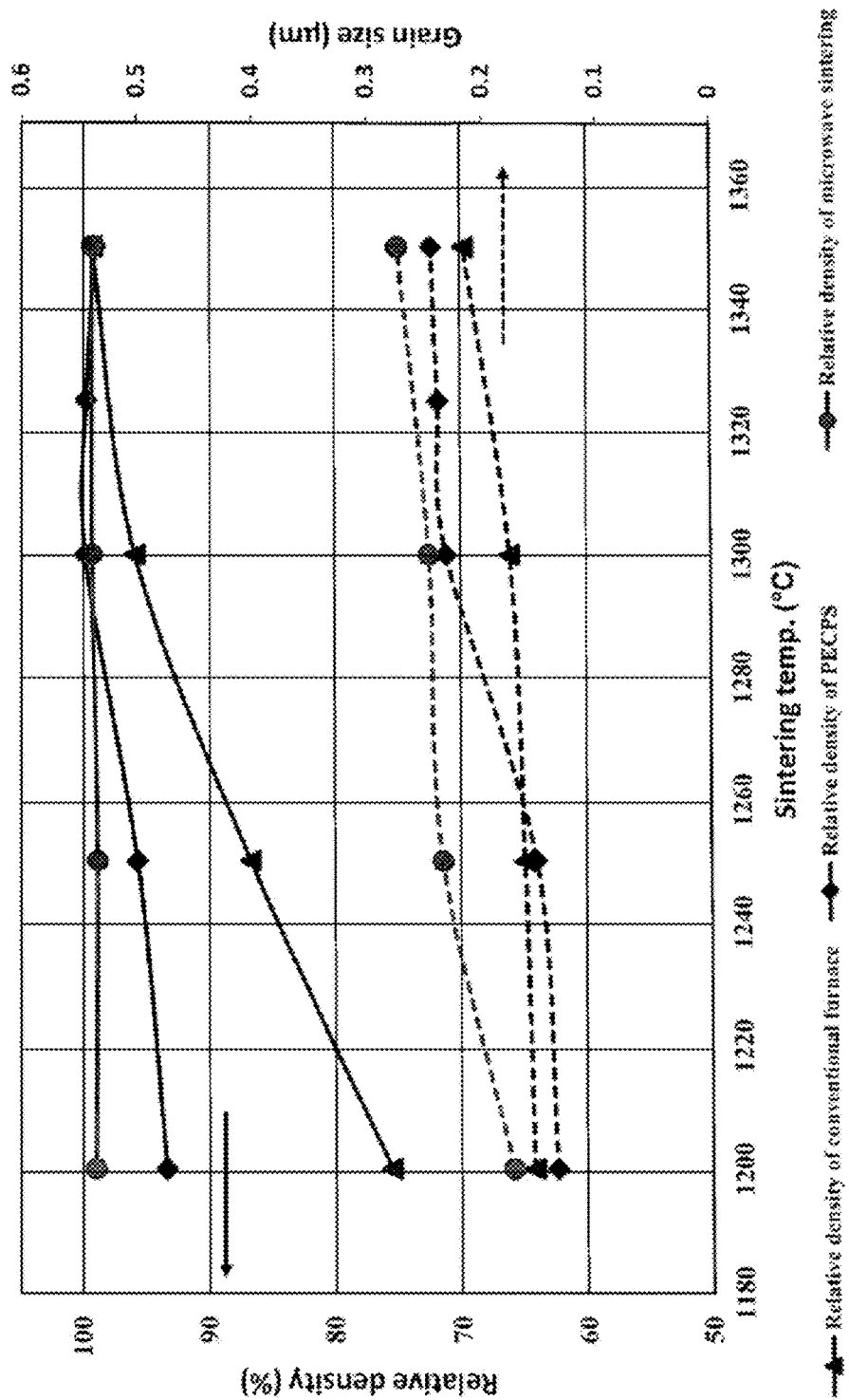
FIG. 5 is a graph illustrating the relationships between the relative density of $ZrO_2$(3Y)-20 mass % $Al_2O_3$ ceramics produced using various sintering methods and grain size of sintered body and sintering temperature.
Figure 9:
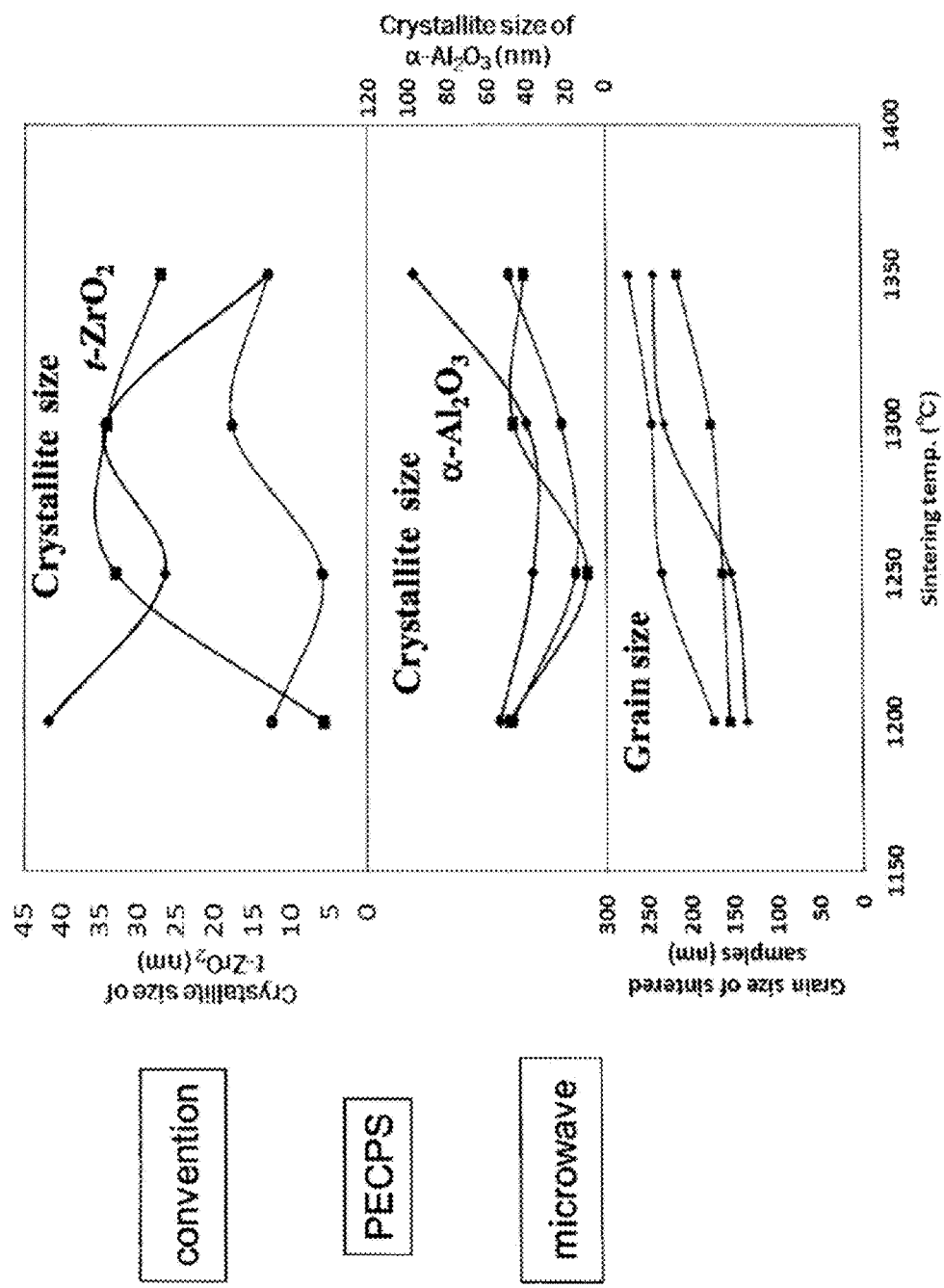
FIG. 9 is a graph illustrating the relationships between the "grain size" and "crystallite size" of a t-$ZrO_2$ phase and an α-$Al_2O_3$ phase in a $ZrO_2(3Y)$-20 mass % $Al_2O_3$ ceramic produced at 1200 to 1350° C. using each sintering method. Here, a square represents a ceramic produced by atmospheric sintering; a diamond represents a ceramic produced by PECPS; and a circle represents a ceramic produced by microwave sintering.

| | Sintering method | Sintering temperature (° C.) | $D_{obs}$ (g/cm³) | $D_{obs}/D_x$ (g/cm³) | Crystallite size t-ZrO$_2$ (nm) | Crystallite size m-ZrO$_2$ (nm) | Crystallite size α-Al$_2$O$_3$ (nm) |
|---|---|---|---|---|---|---|---|
| Example 3 Comparative Example 4 | Conventional | 1350 | 5.46 | 99.3 | 27.0 | 6.17 | 41.7 |
| Comparative Example 5 | PECPS | 1200 | 5.13 | 93.4 | 41.7 | 6.58 | 53.7 |
| Comparative Example 6 | PECPS | 1250 | 5.26 | 95.7 | 26.4 | 3.12 | 37.1 |
| Comparative Example 7 | PECPS | 1300 | 5.49 | 99.9 | 34.2 | 14.70 | 40.3 |
| Comparative Example 8 | PECPS | 1350 | 5.44 | 99.1 | 13.0 | 6.50 | 97.0 |
| | | | Related to FIG. 5 | FIG. 5 | FIG. 9 | FIG. 9 | FIG. 9 |

From Table 1 above, only the ceramics of Examples 1 to 4 produced by microwave sintering simultaneously satisfied the sintering density condition of having a relative density $D_{obs}/D_x$ of not less than 99.0% and having crystallite sizes of both t-ZrO and α-Al$_2$O$_3$ at this time of not greater than 25 nm and not greater than 75 nm, respectively at all of the sintering temperature ranges, and an increase in sintering density and the suppression of crystallite size growth were confirmed. In the ceramics of Comparative Examples 1 to 4 produced by the conventional method (with an atmosphere-controlled electric sintering furnace) and by PECPS, it was presumed that the results indicated different relationships between the sintering density and crystallite size due to the fact that the growth of crystallite size was accelerated by the heating method or the thermal history derived therefrom.

Table 2 below summarizes the structural characteristic values of the sintered compacts of Examples 1 to 4 and Comparative Examples 1 to 8.

TABLE 2

Figure 6:
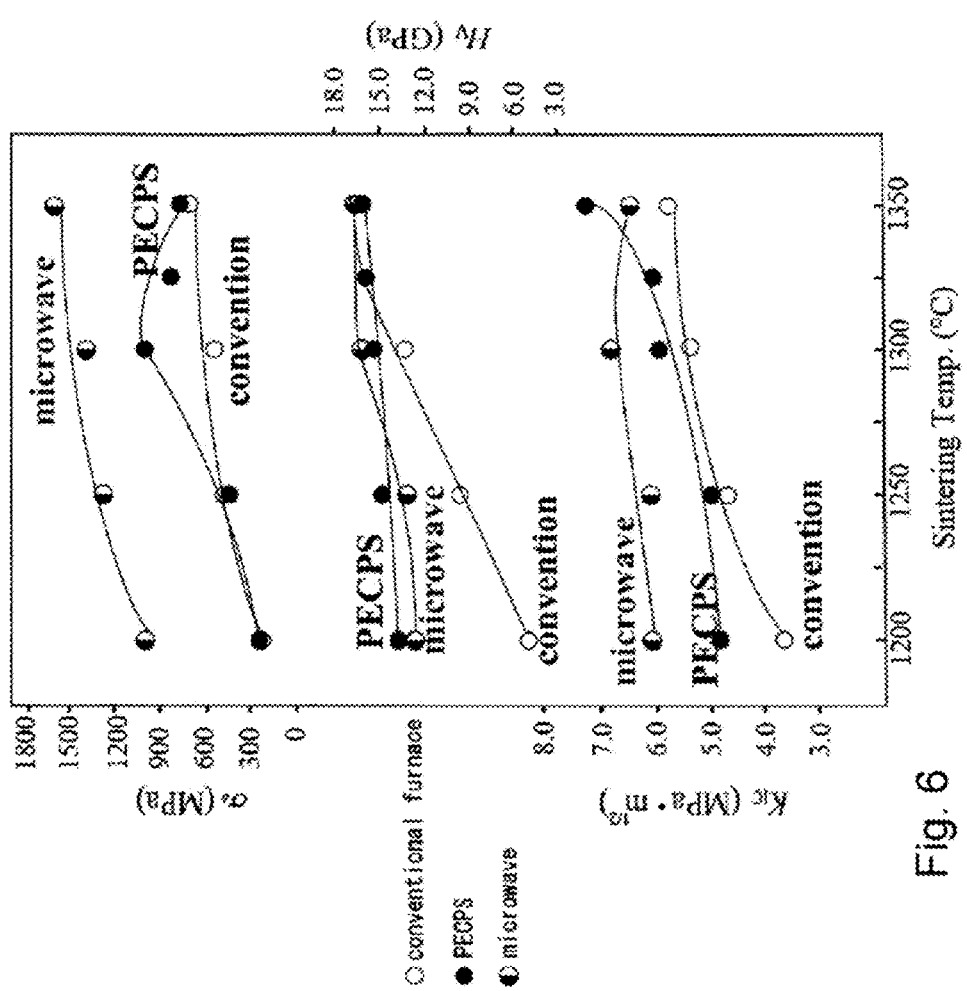
FIG. 6 is a graph illustrating the relationships between the bending strength $\sigma_b$, Vickers hardness $H_v$, and fracture toughness value $K_{IC}$ of $ZrO_2$(3Y)-20 mass % $Al_2O_3$ ceramics produced using various sintering methods and the sintering temperature; (a) ○ represents sintering using an ordinary electric sintering furnace with a controlled atmosphere; (b) ● represents sintering with PECPS; and (c) the circle with the left-half filled black represents microwave sintering.

| | Sintering method | Sintering temperature (° C.) | $\sigma_b$ (GPa) | $H_v$ (GPa) | $K_{IC}$ (MPa·m$^{1/2}$) |
|---|---|---|---|---|---|
| Example 1 | Microwave | 1200 | 1.01 | 12.9 | 6.02 |
| Example 2 | Microwave | 1250 | 1.26 | 13.1 | 6.03 |
| Example 3 | Microwave | 1300 | 1.41 | 15.7 | 6.90 |
| Example 4 | Microwave | 1350 | 1.54 | 15.7 | 6.41 |
| Comparative Example 1 | Conventional | 1200 | 0.269 | 5.26 | 3.73 |
| Comparative Example 2 | Conventional | 1250 | 0.532 | 9.44 | 4.72 |
| Comparative Example 3 | Conventional | 1300 | 0.557 | 13.8 | 5.29 |
| Comparative Example 4 | Conventional | 1350 | 0.651 | 15.7 | 5.81 |
| Comparative Example 5 | PECPS | 1200 | 0.276 | 14.0 | 4.86 |
| Comparative Example 6 | PECPS | 1250 | 0.459 | 14.9 | 4.96 |
| Comparative Example 7 | PECPS | 1300 | 0.973 | 15.1 | 5.88 |
| Comparative Example 8 | PECPS | 1350 | 0.768 | 15.5 | 7.25 |
| | | | FIG. 6 | FIG. 6 | FIG. 6 |

From Table 2 above, only the ceramics of Examples 1 to 4 produced by microwave sintering yielded excellent structural characteristic values simultaneously satisfying a three-point bending strength $\sigma_b$ of not less than 1.0 GPa and a fracture toughness value of 6.0 MPa·m$^{1/2}$ at all of the sintering temperature ranges. The Vickers hardness $H_V$ for these samples was from 12.9 to 15.6 GPa. Although the reason for exhibiting excellent structural characteristics is not certain, it is conceivable that the results indicate that the increase in sintering density and the suppression of crystallite size growth that were apparent in Table 1 yielded harmonious functionality of ZrO$_2$ and Al$_2$O$_3$ in contrast with the ceramics of Comparative Examples 1 to 4 produced by the conventional method (with an atmosphere-controlled electric sintering furnace) and by PECPS.

• Example of a Production Step for the High-Strength/Toughness ZrO$_2$—Al$_2$O$_3$-Based Ceramic Sintered Compact Production Method According to an Embodiment of the Present Invention FIG. 1 is a flowchart illustrating an example of each step in the high-strength/toughness ZrO$_2$—Al$_2$O$_3$-based ceramic sintered compact production method according to an embodiment of the present invention using microwave sintering. The production conditions of each step used in the examples are listed, but the present invention is not limited to these conditions. Note that the sintering conditions for electric sintering and Pulsed Electric-Current Pressure Sintering (PECPS) used in the comparative examples are also listed in this flowchart.

• XRD Pattern Measurement Results

Figure 2:
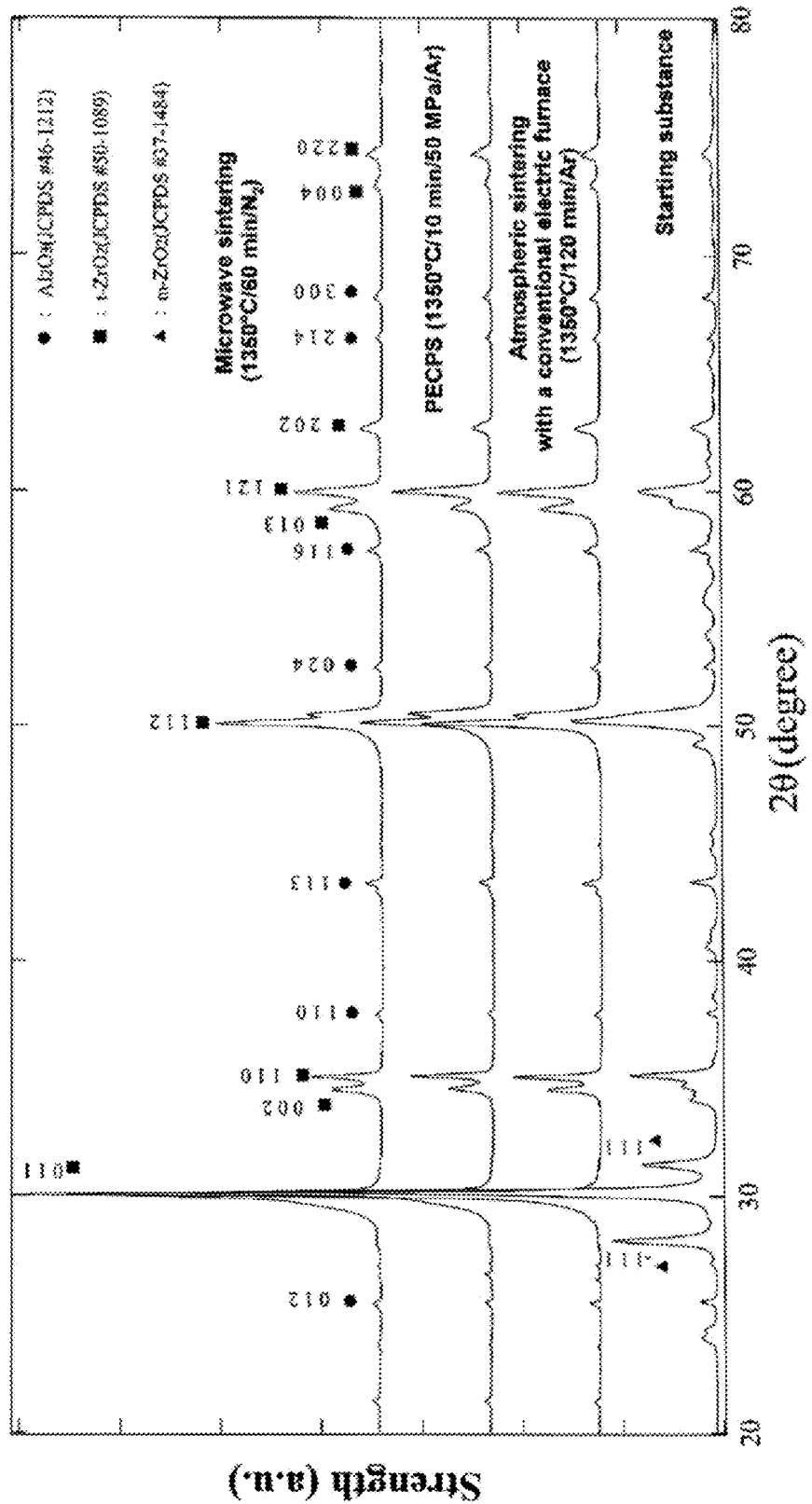
FIG. 2 shows XRD patterns of various composites, in which the pattern with reference to "Starting substance" is an XRD pattern of a $ZrO_2$(3Y)-20 mass % $Al_2O_3$ mixed powder serving as a starting material; the pattern with reference to "Atmospheric sintering with a conventional electric furnace (1350° C./120 min/Ar)" is an XRD pattern of a ceramic produced by sintering with an ordinary electric sintering furnace with a controlled atmosphere; the pattern with reference to "PECPS (1350° C./10 min/50 MPa/Ar)" is an XRD pattern of a ceramic produced by PECPS; and the pattern with reference to Microwave sintering (1350° C./60 min/$N_2$)" is an XRD pattern of a ceramic produced by microwave sintering.

In FIG. 2, which the pattern with reference to "Starting substance" is an XRD pattern of a ZrO$_2$(3Y)-20 mass % Al$_2$O$_3$ composite powder serving as a starting material prior to sintering; the pattern with reference to "Atmospheric sintering with a conventional electric furnace (1350° C./120 min/Ar)" is an XRD pattern of a ceramic produced by the conventional method, sintering with an ordinary electric sintering furnace with a controlled atmosphere; the pattern with reference to "PECPS (1350° C./10 min/50 MPa/Ar)" is an XRD pattern of a ceramic produced by PECPS; and the pattern with reference to Microwave sintering (1350° C./60 min/N$_2$)" is an XRD pattern of a ceramic produced by microwave sintering.

It was confirmed from these XRD patterns that m-ZrO$_2$ (monoclinic zirconia) in the starting material disappeared due to sintering, and that each of the sintered compacts comprised t-ZrO$_2$ (tetragonal zirconia) and an α-Al$_2$O$_3$ phase.

• Comparison of SEM Images of Fractured Surface and Polished Surface. FIG. 3A to FIG. 3F illustrate scanning electron microscope (SEM) photographs of fracture surfaces for ZrO$_2$(3Y)-20 mass % Al$_2$O$_3$ composite ceramics produced using each sintering method (sintering temperature of 1250° C. for FIG. 3A, FIG. 3B, and FIG. 3C, and sintering temperature of 1350° C. for FIG. 3D, FIG. 3E, and FIG. 3F). FIG. 4A to FIG. 4C illustrate SEM photographs of polished surfaces for $ZrO_2(3Y)$-20 mass % $Al_2O_3$ ceramics produced at 1350° C. using each sintering method.

In the photographs of FIG. 4A to FIG. 4C, the black regions are areas where alumina particles are present. It can be seen from a comparison of these SEM photographs that the surface conditions of ceramics produced by microwave sintering differ from the surface conditions of ceramics produced by other sintering methods.

• Relative Density Measurement Results

FIG. 5 is a graph illustrating the relationship between the relative density of $ZrO_2(3Y)$-20 mass % $Al_2O_3$ ceramics produced using each methods and sintering temperature and the relationship between relative density and crystal particle size and sintering temperature. It was confirmed from this graph that ceramics with a larger crystal particle size are obtained in the case of microwave sintering than in the case of other sintering methods, and that a dense sintered compact having a relative density of 99.0% can be produced even when the sintering temperature is 1200° C., which is approximately 150° C. lower than the temperature in a conventional sintering method.

• Measurement Results of Various Characteristics

FIG. 6 illustrates the relationships between the bending strength $\sigma_b$, Vickers hardness $H_v$, and fracture toughness value $K_{IC}$ of $ZrO_2(3Y)$-20 mass % $Al_2O_3$ ceramics produced using each sintering method and the sintering temperature. In the case of microwave sintering, it was confirmed that the bending strength $\sigma_b$ was greater (from 1.0 to 1.5 GPa) than in the case of other sintering methods, the Vickers hardness $H_v$ (12 GPa or higher) was equivalent to that of ceramics produced by Pulsed Electric-Current Pressure Sintering, and the fracture toughness value $K_{IC}$ is a large value (approximately 6 MPa·m$^{1/2}$) even when the sintering temperature is from 1200 to 1250° C.

• Comparison of TEM Images of Fractured Surface

Figure 7:
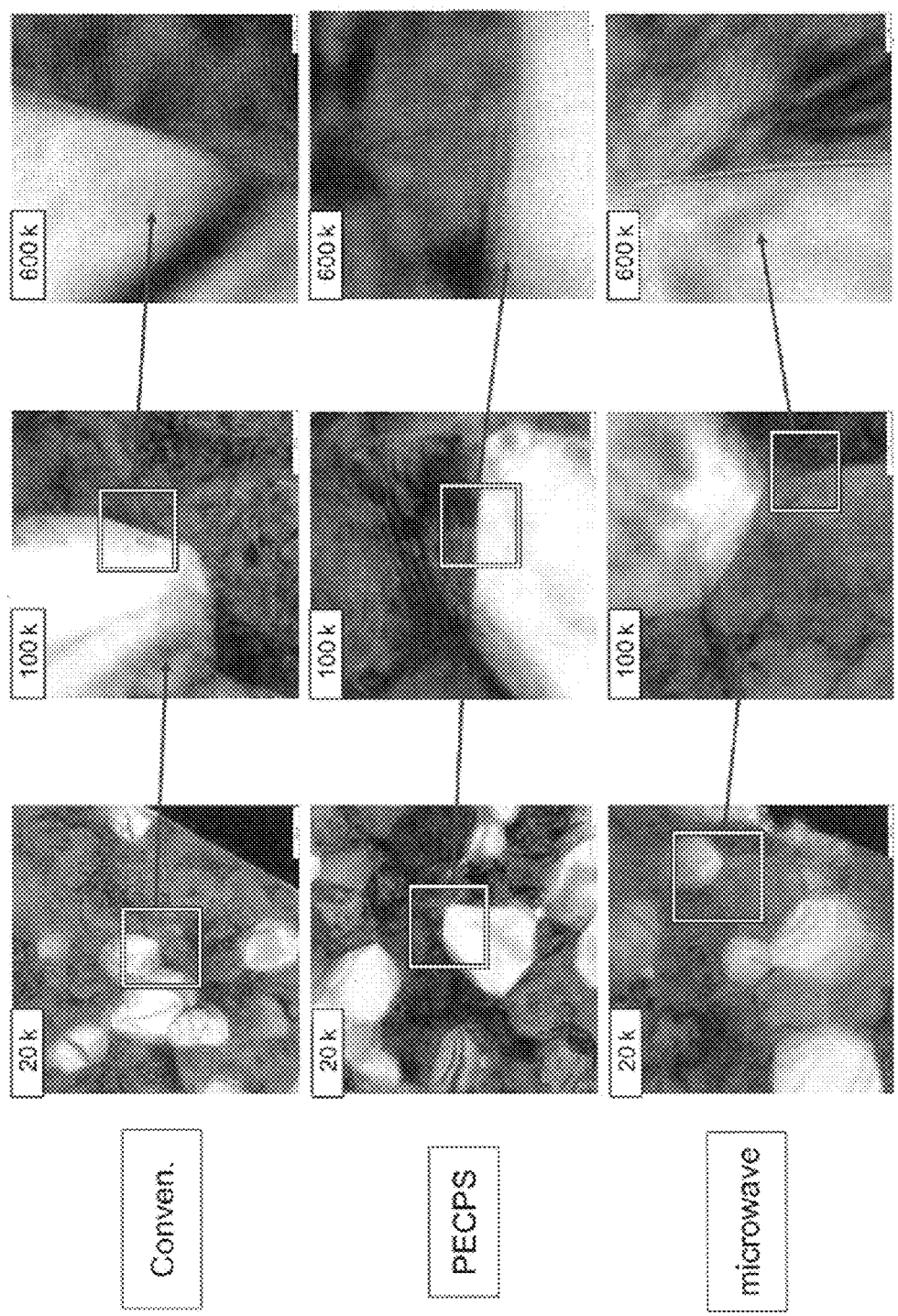
FIG. 7 illustrates transmission electron microscope (TEM) photographs of fracture surfaces of $ZrO_2$(3Y)-20 mass % $Al_2O_3$ ceramics sintered at 1350° C. for 120 minutes in the case of sintering using an ordinary electric sintering furnace with a controlled atmosphere, 10 minutes in the case of PECPS, and for 60 minutes in the case of microwave sintering.

FIG. 7 illustrates transmission electron microscope (TEM) photographs of fracture surfaces of $ZrO_2(3Y)$-20 mass % $Al_2O_3$ ceramics sintered at a sintering temperature of 1350° C. for 120 minutes in the case of sintering using the conventional electric sintering furnace with a controlled atmosphere, 10 minutes in the case of PECPS, and for 60 minutes in the case of microwave sintering. The photograph on the left is a photograph taken at a magnification of 20 k; the photograph in the center is a photograph taken at a magnification of 100 k; and the photograph on the right is a photograph taken at a magnification of 600 k (here, "k" refers to 1,000 times).

In these TEM images, the regions that appear white are $Al_2O_3$, and the regions that appear black are $ZrO_2$. From a comparison of the TEM images at a magnification of 600 k, striped structures in the vertical direction are observed at the interfaces of the $ZrO_2$ and $Al_2O_3$ particles of the ceramics produced by microwave sintering, and it is considered that thin layers that cannot be detected by X-ray diffraction are present at the interfaces.

• Comparison of EDS Images of Microstructures

Figure 8:
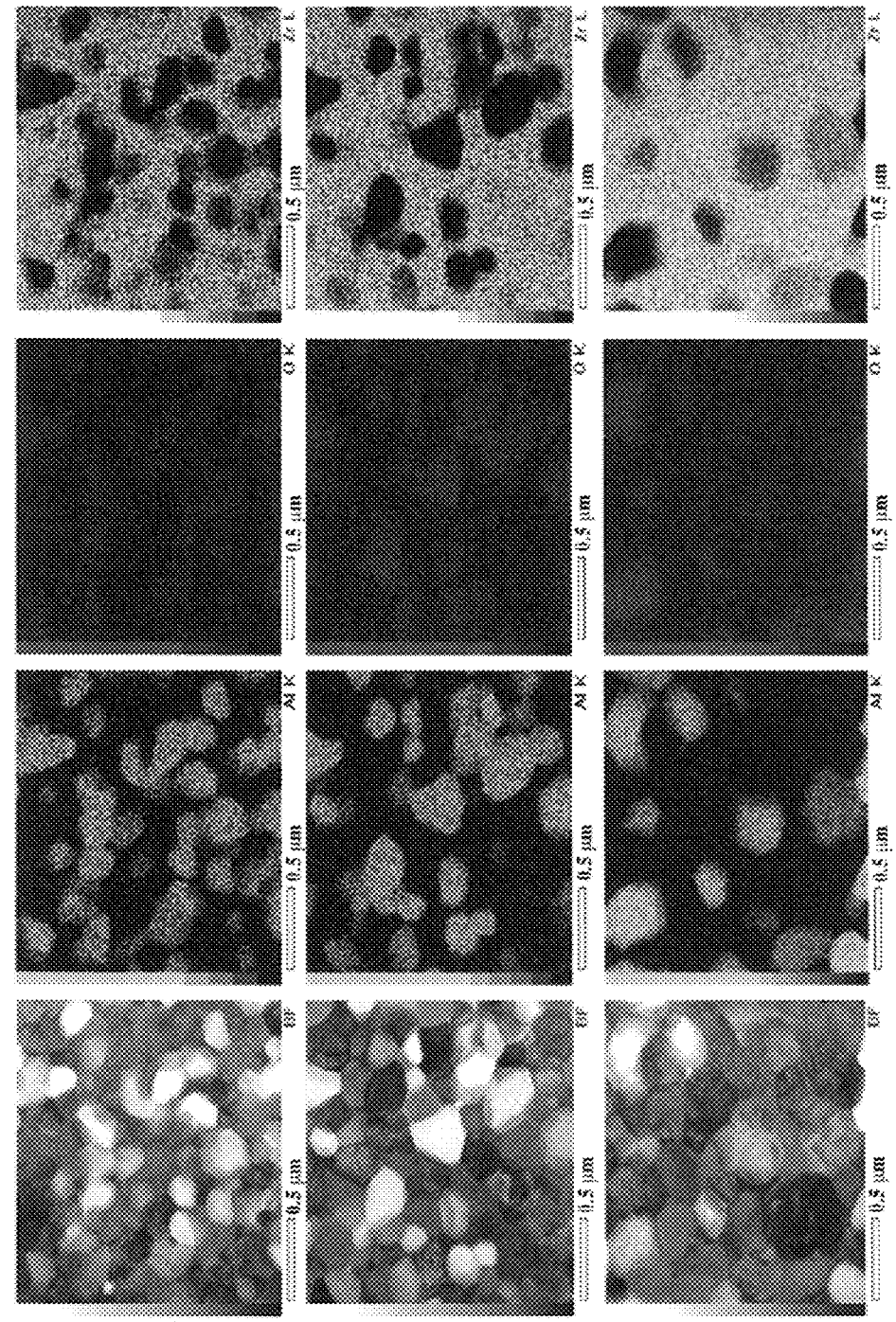
FIG. 8A to FIG. 8C illustrate energy-dispersive X-ray spectroscopic (EDS) electron microscope photographs of the microstructures of $ZrO_2(3Y)$-20 mass % $Al_2O_3$ ceramics sintered at 1350° C. using various sintering methods; the photographs are, in order from left to right, an ordinary transmission electron microscope photograph, an image indicating the positions where Al is present, an image indicating the positions where oxygen O is present, and an image indicating the positions where Zr is present for sintering using an ordinary electric sintering furnace with a controlled atmosphere (FIG. 8A), PECPS (FIG. 8B), and microwave sintering (FIG. 8C).

FIG. 8A to FIG. 8C illustrate SEM photographs of microstructures of $ZrO_2(3Y)$-20 mass % $Al_2O_3$ ceramics sintered at 1350° C. using each sintering method. The photographs are, in order from left to right, an ordinary transmission electron microscope photograph, an image indicating the positions where Al is present, an image indicating the positions where oxygen O is present, and an image indicating the positions where Zr is present.

From these EDS images, the aggregation of $Al_2O_3$ particles is particularly observed in the case of ceramics produced by sintering with the conventional electric sintering furnace with a controlled atmosphere (FIG. 8A), and the aggregation and particle growth of $Al_2O_3$ particles are observed in the case of ceramics produced by PECPS (FIG. 8B). In contrast, an image in which the $Al_2O_3$ particles are well dispersed is observed in the case of ceramics produced by microwave sintering (FIG. 8C).

Table 3 below summarizes the lattice constants and crystallite sizes of the tetragonal t-$ZrO_2$ phase, the monoclinic m-$ZrO_2$ phase, and the α-$Al_2O_3$ phase determined by X-ray diffraction measurements for the ceramics produced using each sintering method at 1350° C.

TABLE 3

Lattice constants and crystallite size of t- and m-$ZrO_2$, and α-$Al_2O_3$ phases in the composites sintered at 1350° C. using each sintering method

| Sintering conditions | | a (nm) | b (nm) | c (nm) | β (°) | Crystallite size (nm) |
|---|---|---|---|---|---|---|
| Conventional | t-$ZrO_2$ | 0.361 | 0.361 | 0.518 | 90.0 | 27.0 |
| | m-$ZrO_2$ | 0.521 | 0.596 | 0.485 | 89.0 | 6.17 |
| | α-$Al_2O_3$ | 0.476 | 0.476 | 1.30 | 90.0 | 41.7 |
| PECPS | t-$ZrO_2$ | 0.361 | 0.361 | 0.518 | 90.0 | 13.0 |
| | m-$ZrO_2$ | 0.512 | 0.523 | 0.517 | 104 | 6.50 |
| | α-$Al_2O_3$ | 0.476 | 0.476 | 1.30 | 90.0 | 97.0 |
| Microwave | t-$ZrO_2$ | 0.361 | 0.361 | 0.517 | 90.0 | 13.0 |
| | m-$ZrO_2$ | 0.577 | 0.538 | 0.513 | 96.4 | 4.29 |
| | α-$Al_2O_3$ | 0.475 | 0.475 | 1.30 | 90.0 | 49.5 |

From Table 3 above, the interaxial angles β were constant for t-$ZrO_2$ and α-$Al_2O_3$ because t-$ZrO_2$ and α-$Al_2O_3$ are tetragonal and hexagonal, respectively. But differences in interaxial angles β were observed for the monoclinic m-$ZrO_2$. In addition, it was observed that ceramics produced by microwave sintering exhibit a smaller $ZrO_2$ crystallite size than ceramics produced by sintering with the conventional electric sintering furnace with a controlled atmosphere and by PECPS and exhibit a smaller $Al_2O_3$ crystallite size than ceramics produced by PECPS.

• Changes in the Crystallite Size and Crystal Particle Size of the t-$ZrO_2$ Phase and the α-$Al_2O_3$ Phase when the Sintering Temperature is Varied FIG. 9 is a graph illustrating the relationships between the "crystallite size" of a t-$ZrO_2$ phase and an α-$Al_2O_3$ phase and "grain size" in a $ZrO_2(3Y)$-20 mass % $Al_2O_3$ ceramic produced at 1200 to 1350° C. using each sintering method.

From FIG. 9, it was confirmed that a tendency is observed in which the "crystallite size" of the t-$ZrO_2$ phase and the α-$Al_2O_3$ phase tends to decrease in the sintering temperature range of from 1200 to 1350° C. for ceramics produced by microwave sintering in comparison to ceramics produced by sintering with an ordinary electric sintering furnace with a controlled atmosphere and by PECPS, while the "grain size" increases. In particular, a characteristic feature is that in microwave sintered compacts, the crystallite size of the t-$ZrO_2$ phase, which influences the strength $\sigma_b$ and the fracture toughness value $K_{IC}$ of zirconia-based ceramics, is as small as 5 to 20 nm. It has been reported that the mechanical characteristics of polycrystals is inversely proportional to the grain size Gs if the relative density is the same. However, in zirconia-based ceramics related to the present invention, it was discovered for the first time that the strength and toughness are dependent not on the grain size but on the size of the crystallites constituting the crystal particles—that is, the "crystallite size"—are enhanced as the crystallite size decreases.

Table 4 below summarizes the values of the volume ratio of the t/m-$ZrO_2$ phases, the relative density $D_{obs}/D_x$, the fracture toughness value $K_{IC}$, the Vickers hardness $H_V$, and the bending strength $\sigma_b$ of the ceramics sintered at 1350° C. using each sintering method.

TABLE 4

|  | Atmospheric furnace sintering Sintered at 1350° C./120 min | PECPS, Sintered at 1350° C./10 min/50 MPa | Microwave Sintered at at 1350° C./ 60 min |
| --- | --- | --- | --- |
| t/m volume ratio | 93.3/6.7 (%) | 99.5/0.5 (%) | 96.6/3.4 (%) |
| $D_{obs}$, $D_{obs}/D_x$ | 5.46 Mg/m³ (99.3%) | 5.44 Mg/m³ (99.1%) | 5.46 Mg/m³ (99.3%) |
| Fracture toughness value $K_{IC}$ | 5.81 MPa·m$^{1/2}$ | 7.25 MPa·m$^{1/2}$ | 6.41 MPa·m$^{1/2}$ |
| Vickers hardness $H_v$ | 15.7 GPa | 15.5 GPa | 15.7 GPa |
| Bending strength $\sigma_b$ | 0.651 GPa | 0.768 GPa | 1.54 GPa |

The results of Table 4 above indicate that sintering yielded good results in the relative density (99.1 to 99.3%), the Vickers hardness $H_V$ (15.5 to 15.7 GPa), the fracture toughness value $K_{IC}$ (5.81 to 7.25 MPa·m$^{1/2}$) in each sintering method. In particular, the production method according to an embodiment of the present invention using microwave sintering is excellent in that a $ZrO_2$—$Al_2O_3$-based ceramic having a bending strength $O_b$ greater than approximately twice that of a ceramic produced by sintering using a conventional electric sintering furnace with a controlled atmosphere or PECPS is obtained.

In addition, with regard to the point of raw material cost, whereas the cost per 1 g of raw material is more than several thousand yen for a commercially available yttria partially stabilized zirconia-alumina powder produced with a sol-gel method, a mixed powder of a typical microparticulate $ZrO_2$ (3Y) and $Al_2O_3$ or a powder prepared using a coprecipitation process used in the production method of the present invention can be produced at a low cost of less than approximately 1/100 the cost described above, so the production method according to an embodiment of the present invention using microwave sintering is a method with outstanding economic efficiency. Further, microwave sintering, which is pressureless sintering, yields high shape-imparting properties, and a ceramic produced by an embodiment according to the present invention also has the merit that it can be easily developed to other applications together with the high mechanical characteristics thereof.

INDUSTRIAL APPLICABILITY

By using the production method according to an embodiment of the present invention, a high-strength/toughness $ZrO_2$—$Al_2O_3$-based ceramic having a bending strength $\sigma_b \geq 1$ GPa, a fracture toughness value $K_{IC} \geq 6$ MPa·m$^{1/2}$, and a Vickers hardness $H_V \geq 12$ GPa can be produced. Such a high-strength/toughness $ZrO_2$—$Al_2O_3$-based ceramic can be used in various applications in which these characteristics are required, such as ceramic machine parts, ceramics for living organisms (dental implants, artificial joints, and artificial bones), and the like, for example.

The invention claimed is:

1. A $ZrO_2$—$Al_2O_3$-based ceramic sintered compact comprising a $Y_2O_3$ partially stabilized $ZrO_2$—$Al_2O_3$ composite sintered compact having a molar ratio (mol %) of zirconia ($ZrO_2$) and yttria ($Y_2O_3$) of from 96.5:3.5 to 97.5:2.5 and a mass ratio (mass %) of zirconia containing yttria and alumina ($Al_2O_3$) of from 85:15 to 75:25; wherein the $ZrO_2$—$Al_2O_3$ composite sintered compact contains tetragonal $ZrO_2$ particles having a crystallite size of from 5 to 20 nm as a main component, a crystallite size of α-$Al_2O_3$ is not greater than 75 nm; and the sintered compact has a relative density of not less than 99%.

2. The $ZrO_2$—$Al_2O_3$-based ceramic sintered compact according to claim 1, wherein a three-point bending strength is not less than 1.0 GPa; a fracture toughness is not less than 6.0 MPa·m$^{1/2}$; and a Vickers hardness $H_V$ is not less than 12.0 GPa.

3. A production method for a $ZrO_2$—$Al_2O_3$-based ceramic sintered compact described in claim 1, comprising the following steps:
(A): preparing a $Y_2O_3$ partially stabilized $ZrO_2$—$Al_2O_3$-based powder having a molar ratio (mol %) of zirconia ($ZrO_2$) and yttria ($Y_2O_3$) of from 96.5:3.5 to 97.5:2.5 and a mass ratio (mass %) of zirconia containing yttria and alumina ($Al_2O_3$) of from 85:15 to 75:25; and
(B): producing a high-density compact by molding the $Y_2O_3$ partially stabilized $ZrO_2$—$Al_2O_3$-based powder by cold isostatic pressing and then performing microwave sintering on the compact in an inert gas atmosphere at 1200 to 1400° C. for 45 to 90 min.

4. The method according to claim 3, wherein a heating rate during performing microwave sintering in (B) is from 5 to 20° C./min up to 600° C. and from 50 to 150° C./min at 600° C. or higher.

5. The method according to claim 3, wherein a mixture of a $Y_2O_3$ partially stabilized $ZrO_2$ and an $Al_2O_3$ powder or a solid solution powder produced by a coprecipitation process is used as the $Y_2O_3$ partially stabilized $ZrO_2$—$Al_2O_3$-based powder.

6. A production method for a $ZrO_2$—$Al_2O_3$-based ceramic sintered compact described in claim 2, comprising the following steps:
(A): preparing a $Y_2O_3$ partially stabilized $ZrO_2$—$Al_2O_3$-based powder having a molar ratio (mol %) of zirconia ($ZrO_2$) and yttria ($Y_2O_3$) of from 96.5:3.5 to 97.5:2.5 and a mass ratio (mass %) of zirconia containing yttria and alumina ($Al_2O_3$) of from 85:15 to 75:25; and
(B): producing a high-density compact by molding the $Y_2O_3$ partially stabilized $ZrO_2$—$Al_2O_3$-based powder by cold isostatic pressing and then performing microwave sintering on the compact in an inert gas atmosphere at 1200 to 1400° C. for 45 to 90 min.

7. The method according to claim 4, wherein a mixture of a $Y_2O_3$ partially stabilized $ZrO_2$ and an $Al_2O_3$ powder or a solid solution powder produced by a coprecipitation process is used as the $Y_2O_3$ partially stabilized $ZrO_2$—$Al_2O_3$-based powder.

* * * * *